United States Patent [19]
Edelman

[11] Patent Number: 5,680,563
[45] Date of Patent: Oct. 21, 1997

[54] OBJECT-ORIENTED OPERATING SYSTEM ENHANCEMENT FOR FILTERING ITEMS IN A WINDOW

[75] Inventor: Bradley A. Edelman, Cupertino, Calif.

[73] Assignee: Object Technology Licensing Corporation, Cupertino, Calif.

[21] Appl. No.: 280,169

[22] Filed: Jul. 25, 1994

[51] Int. Cl.$^6$ .............................. G06F 15/00; G06F 7/00
[52] U.S. Cl. ...................... 395/348; 395/349; 395/603; 395/604
[58] Field of Search ................................. 395/155, 157, 395/159, 161, 334, 335, 339, 340, 348, 349, 351, 603, 604, 605

[56] References Cited

U.S. PATENT DOCUMENTS

| | | | |
|---|---|---|---|
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,315,703 | 5/1994 | Matheny . | |
| 5,388,264 | 2/1995 | Tobias, II et al. | 395/650 |
| 5,504,852 | 4/1996 | Thompson-Rohrlich | 395/159 |
| 5,519,865 | 5/1996 | Kondo et al. | 395/600 |

OTHER PUBLICATIONS

IBM Technical Disclosure Bulletin, V.37, No. 4B, Apr. 1994, New York, US, pp. 423–425, Graphical User Interface for LAN NetView Fix — Event Log Filter Notebook.

IBM OS/2 Developer, V. 5 No. 2, Apring 1993, US, pp. 48–59, Peter Haggar & Peter Brightbill: "Programming the OS/2 Container Control by Example".

IBM Technical Disclosure Bulletin, V. 34, No. 7A, Dec. 1991, New York, US, pp. 83–84, "X 400 Smartmail Filter Object Document".

*Primary Examiner*—Mark R. Powell
*Assistant Examiner*—Ba Huynh
*Attorney, Agent, or Firm*—Bookstein & Kudirka

[57] ABSTRACT

A filtering framework in an object oriented operating system with a processor, such as an IBM PowerPC, a storage connected to and controlled by the processor, a display connected to and controlled by said processor, an object-oriented operating system resident in the storage and under the control of the processor, a view framework in the object-oriented operating system for managing a window on the display, a container framework in the object-oriented operating system for storing and manipulating information indicative of each item displayed in the window on the display, and a filter framework in the object-oriented operating system containing a method and data which respond to selection of a particular filter object and application of the filter object to each item displayed in the window to filter out all items not matching a particular characteristic that is not currently required. The filtered out items in a preferred embodiment are gathered into a bundle of unusable items and displayed in a group. Whereas, the items meeting the particular characteristic are displayed normally on the display along with a count of the items that are currently active on the display.

24 Claims, 8 Drawing Sheets

OBJECT-ORIENTED OPERATING SYSTEM ENHANCEMENT FOR FILTERING ITEMS IN A WINDOW

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office, but otherwise reserves all copyright rights whatsoever.

FIELD OF THE INVENTION

This invention generally relates to improvements in computer systems with an object-oriented operating system and, more particularly, to an enhancement to filter items displayed in a window.

BACKGROUND OF THE INVENTION

Modern computer systems utilize an operating system with windowing capability to display items of interest to a user. Examples of such systems include Microsoft Windows, X-Windows for Unix operating system platforms, and the OS/2 operating system from IBM. Recently, the OS/2 operating system has even added capability for incorporating limited object-oriented processing into the IBM operating system utilizing a front-end called the System Object Model (SOM). Windows are useful for organizing information on a display and allow a user to collect information associated with a particular feature in a central repository. However, as users have become more proficient with window processing, they have demanded an additional capability not currently available in any of the aforementioned windowing environments to better utilize an individual window and utilize the information therein.

SUMMARY OF THE INVENTION

The improvement for window environments is a flexible, object-oriented filtering capability to be applied to a window to select only certain items to be individually displayed and all additional items to be grouped collectively. For example, if a window contained five-hundred items ranging from document folders to help information to alias information, and the user only was interested in viewing the alias items, an alias filter is selected and applied to the window items. The window items would be updated with a new item count reflecting the number of visible alias items and the window would be updated to display only the alias items.

The filtering system is provided with a flexible interface by using object-oriented programming techniques and providing filtering objects organized in a filtering framework containing the filter objects. New filter objects can inherit function from existing filter objects and customized for a particular requirement.

DETAILED DESCRIPTION OF THE ILLUSTRATIVE EMBODIMENT

Figure 1:
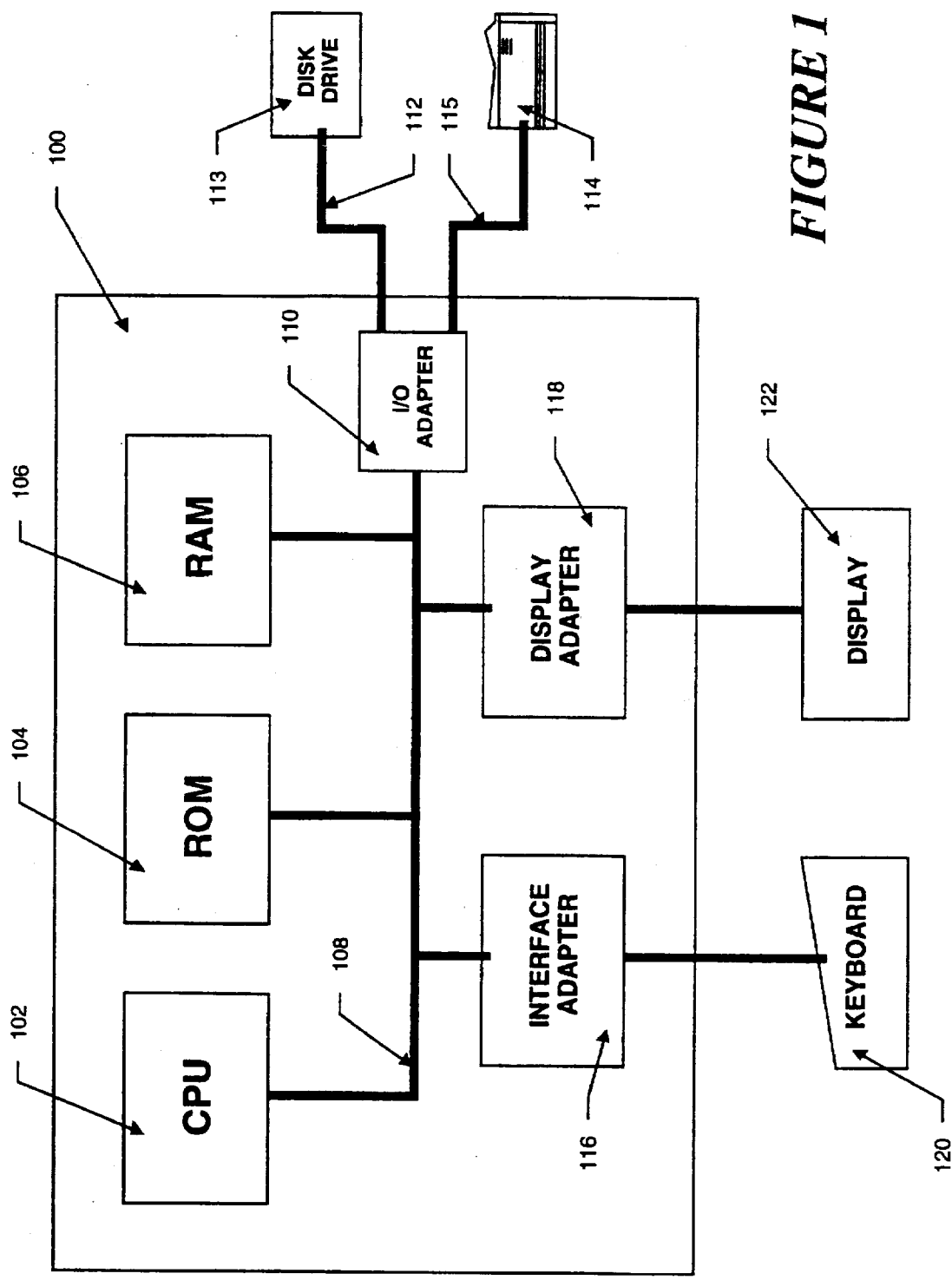
FIG. 1 is a block schematic diagram of a computer system, for example, a personal computer system on which the inventive object-oriented filtering framework operates.

A preferred embodiment of the invention is preferably practiced in the context of an operating system resident on a personal computer such as the IBM PS/2, or Apple Macintosh computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles: encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. In particular such a system framework is used for the filtering and sorting system of the present invention. The filter objects and the sort objects provide their own internal data plus a set of predefined methods for filtering and sorting the items in a particular window into other representations. Consequently, an application software developer who needs filtering and sorting capabilities only needs to supply the characteristics and behavior of the filters, while the framework provides the actual routines which set up the filters, sort the items and reformat the window to display the correct information on the display. The system can also provide information through alternate means other than a visual display. A user could access an electronic mail system using a telephone and use the filtering mechanism described here to limit which messages would be read to the user over the phone.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multimedia, file systems, I/O, testing, etc.

Figure 2:
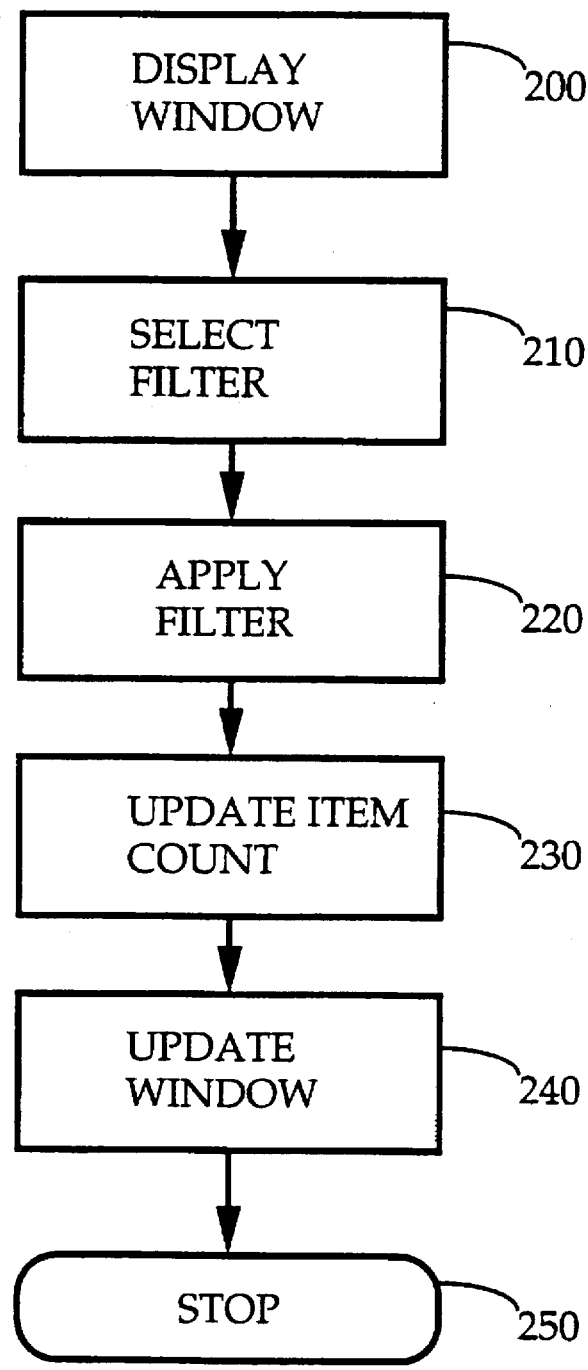
FIG. 2 is a flowchart of the filter processing in accordance with a preferred embodiment.

FIG. 2 is a flowchart of the filtering logic in accordance with a preferred embodiment of the invention. Processing commences at function block 200 where the object-oriented operating system utilizes the view framework to display a window. The view framework is used to manage display real-estate. A view specifies an area of the display and facilitates using the graphics framework to draw images on that part of the display. The view framework provides clipping and depth ordering when views are overlapping. Then, at function block 210, the system detects the selection of a particular filter from a menu of filtering capabilities and applies the filter to the items in the displayed window as shown in function block 220. The application of the filter includes two visible indicia on the display. First, the item count on the display is updated based on the number of items that do not meet the filter property which results in their loss of individual identity on the display and subtraction from the active item count as shown in function block 240. Finally, in function block 240, the window items are updated to display individually only those items that meet the filter requirements. All others are depicted by an icon showing numerous items tied together as a group utilizing a belt. Processing stops at terminal 250.

Figure 3:
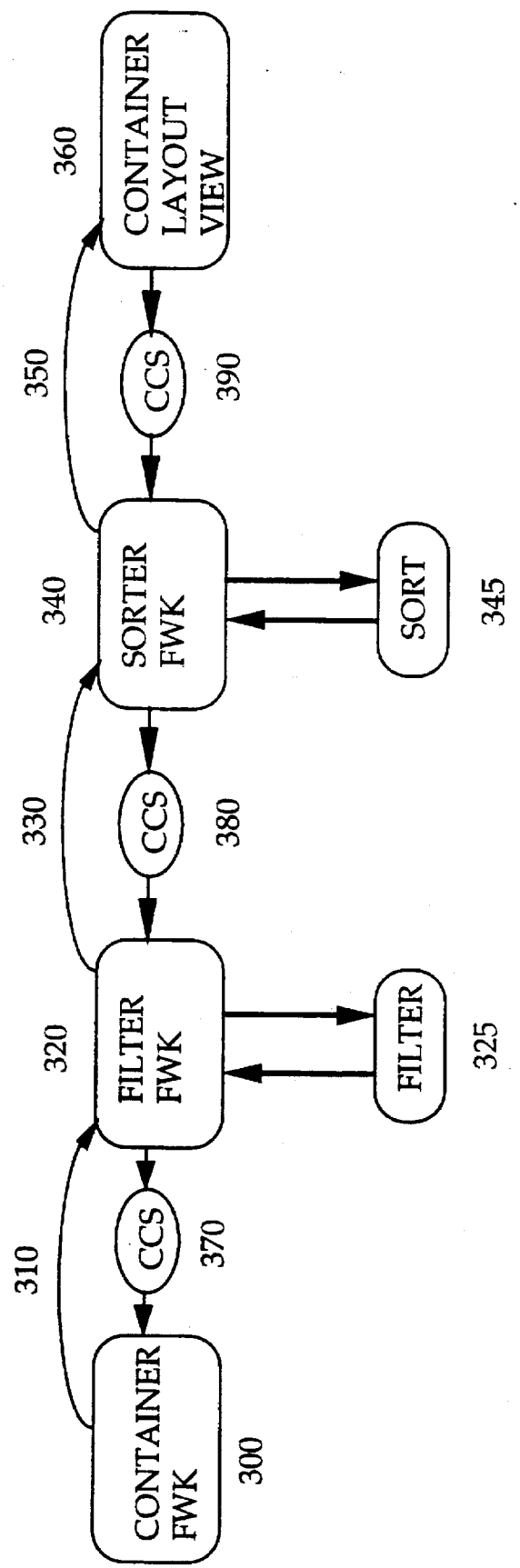
FIG. 3 is a system flow diagram of the filter processing in accordance with a preferred embodiment.
Figure 5:
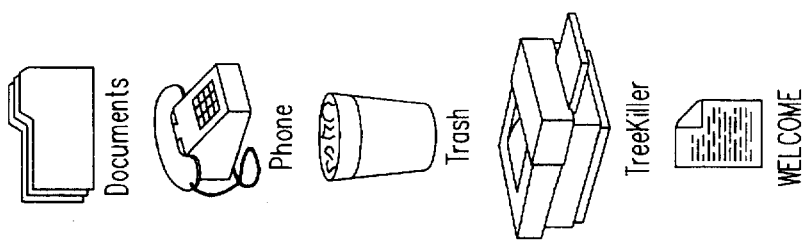
FIG. 5 illustrates a display showing filters in action in accordance with a preferred embodiment.
Figure 5:
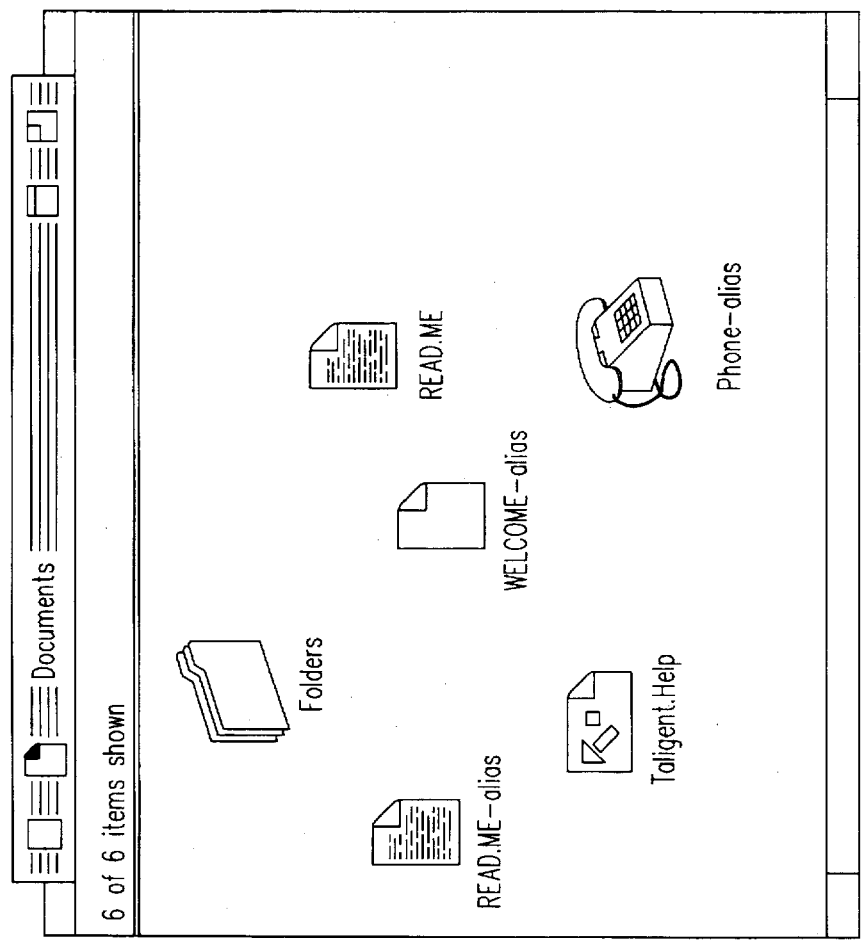
Figure 5:
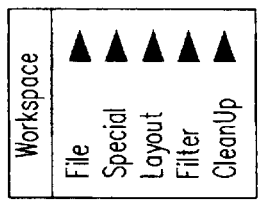

FIG. 3 illustrates how filters are used in accordance with a preferred embodiment of the invention. In the system, information propagates forward using notification 310, 330 and 350 and questions can be asked backward using direct function calls 390, 380 and 370. Filters 325 are held by the filtering framework 320 which provides an important level of indirection. Given this indirection, the filter can be replaced without need for the next node in the information cascade (in this case, the sorter framework 340) to reestablish its connection. Had the filter 325 been in the cascade directly, removal of the filter framework 320 would have broken the cascade. For example, this indirection allows for replacing a "Show Aliases" filter with a "Show Stationery" filter without changing the relationship between any objects except the filter holder and the filter itself. Container Layout View (CLV) 360 is the view information defining the window containing the items as depicted in FIG. 5.

The Containable Component Sources (CCS) objects 370, 380 and 390, provide an important architectural freedom. It does not matter what protocol or base classes an object in the cascade has. It only matters that it a CCS can be implemented for it. This is particularly important in the case where the backing object is the model because it properly obeys the architectural need for a data/presentation split. Had the presentation framework placed base class or protocol requirements on the model, the data/presentation split would have been violated. In the preferred embodiment of the system, the data being presented (i.e. a set of files) is held in a "folder model" which could potentially be used by other presentation systems. However, the presentation system described here demands that every sour of information in the cascade (including the source which is the folder model) must communicate through a CCS interface. Because the folder model can be used with other presentation systems, it would be architecturally incorrect to demand it inherit protocol for use by the presentation. Instead, a CCS that understands how to communicate with the model is implemented which converts the model's protocol into a protocol understood by the presentation system described here.

Figure 4:
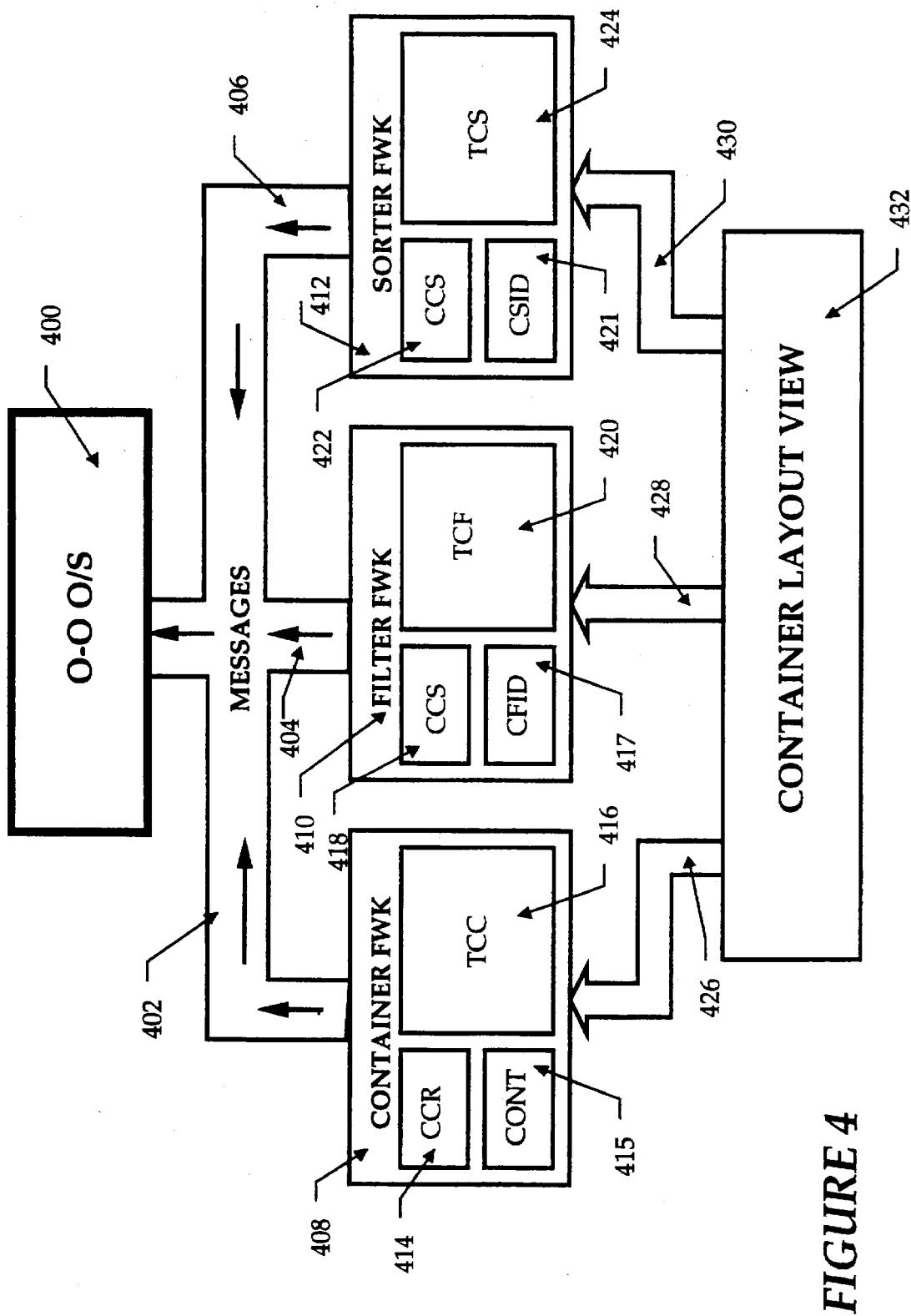
FIG. 4 is a block diagram of the major modules as they are loaded in the memory of a computer in accordance with a preferred embodiment.

FIG. 4 is a schematic block diagram which illustrates the interaction of a container layout view 432 with three frameworks: the container framework 408, the filter framework 410 and the sorter framework 412, which interaction is indicated schematically by arrows 426, 428 and 430, respectively. Each of the three frameworks communicates with the object-oriented operating system 400 in a preferred embodiment. The container framework 408 contains the Containable Component Reference 414 which is a reference for a Containable Component 416 residing in a small amount of memory. The Containable 415 is an object residing in the object oriented operating system containing information indicative of name, icon and children for each of the icons listed in the Container Layout View 431. The Container Layout View 431 maintains a set of containable component references indicative of what items are represented by the other items icon and currently inactive on the display depicted in FIG. 7. The Containable Component is an object which contains information indicative of a containable and information utilized in displaying the containable 415.

The Filter Framework 410 is a collection of objects resident in the object-oriented operating system for enabling filtering. The Containable Container Source 418 provides the information relative to the containable that the filter is processing. The Container Filter 420 is the object that examines a containable and determines whether it should be displayed based on the filtering information. The Container Filter ID 417 is an extensibility mechanism for adding a new id and label for a filter that can thereafter accessed and activated.

The Sorter Framework 412 is a collection of objects resident in the object-oriented operating system for enabling Sorting. The Containable Container Source 422 provides the information relative to the containable that the Sorter is processing. The Container Sorter 424 is the object that examines the set of containables and determines what order they should be displayed in. The Container Sorter ID 421 is an extensibility mechanism for adding a new id and label for a Sorter that can thereafter accessed and activated.

Visual Representation of Filtering

The examples below show various ways of visually representing filtered items; however, two visual indicators appear optimal.

1. A status bar containing information indicative of "X of Y items shown"—this indicates that Y minus X items are not shown because they are filtered.

2. "N Other Items" icon. Where N=Y minus X. An icon that looks like a "stack of documents" appears with a name that indicates how many items are not shown because they are filtered. Alternate methods for visually representing filtered items exist. One possibility would be to "gray out" items which have been filtered and make them non-selectable items on the display. Another would be to "shrink" them so that they would not appear prominently on the display. Depending on the context, different techniques may be more appropriate. The important thing is that a user is aware that items have been filtered and does not believe that the document has been lost.

FIG. 5 illustrates a display from a user perspective showing a window before filtering has been performed in accordance with a preferred embodiment. The document folders are in the default state which displays all items available for use by a user. Note the status bar indicates: "6 of 6 items shown" and that 6 items appear in the folder. The six items currently active in the window are Folders which has a property of stationery, READ ME which has a property of document, Taligent.Help which has a property of document, READ.ME-alias which has a property of alias, WELCOME-alias which has a property of alias, and Phone-alias which has a property of alias. The window is displayed using objects provided by the toolbox which use the view framework to provide the display real-estate for the window and the graphics system to draw the window frame and decoration. The controls framework is used to add controls like the close-box and window-maximizer to the window's title bar. Each item displayed is backed by a "containable" which is an object which provides information about attributes such as name, type, icon, and Visually represented by a view object used to draw the icon and name.

Figure 6:
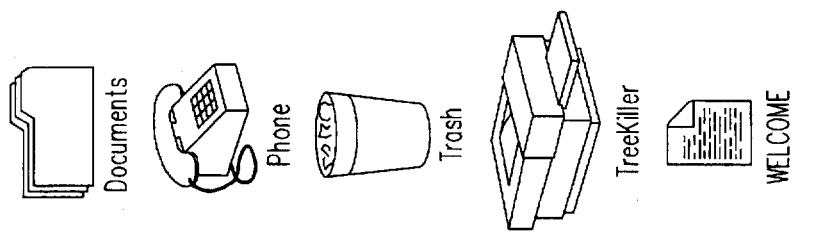
FIG. 6 illustrates a display showing a filter menu torn off from the main menu in accordance with a preferred embodiment.
Figure 6:
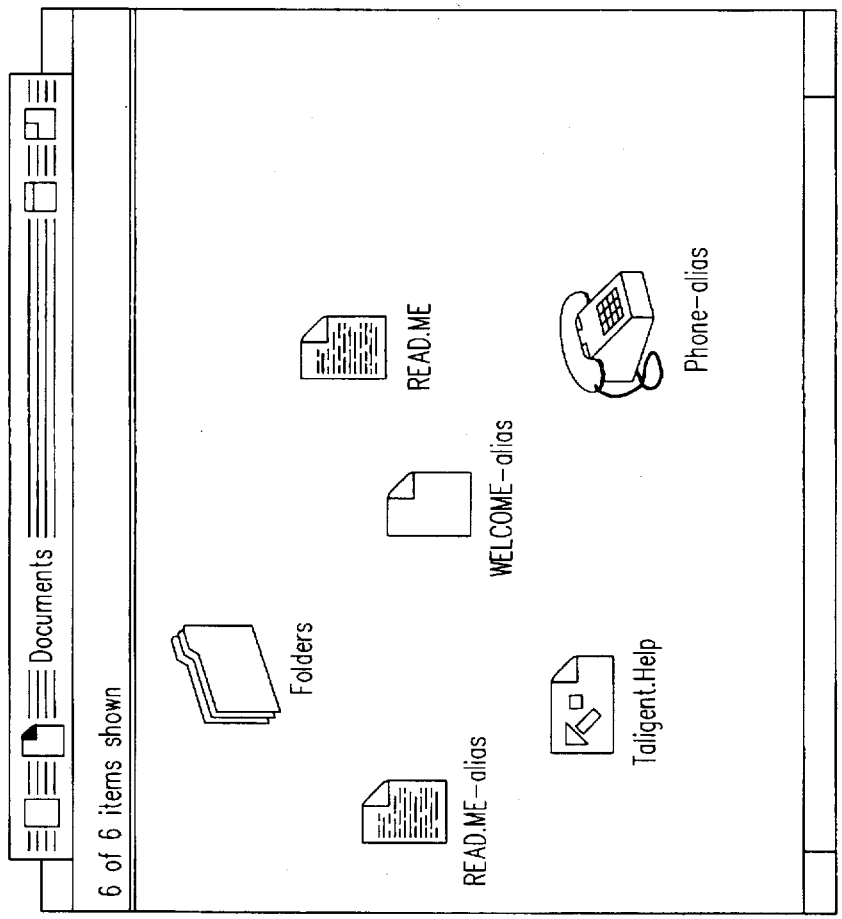
Figure 6:
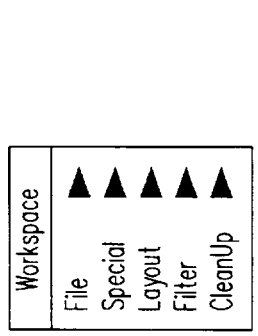

In FIG. 6, a user has "torn off" the Filter Menu. Note that, the filter menu indicates that "Show All" is the selected filter denoted by a check mark located next to the item. The "Show All" filter is the NIL-filter, it does nothing. The Document Folder presentation is unchanged from the previous figure. The system's controls framework provides menu functionality. Using the mouse, a menu can be dragged away from its menu-palette. When the mouse button it released, the menu becomes its own menu palette.

Figure 7:
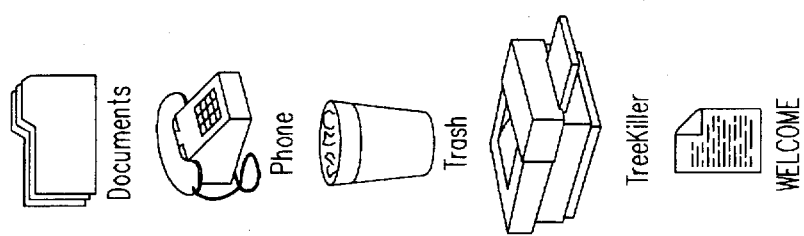
FIG. 7 illustrates a display showing a window after the show aliases filter has been invoked in accordance with a preferred embodiment.
Figure 7:
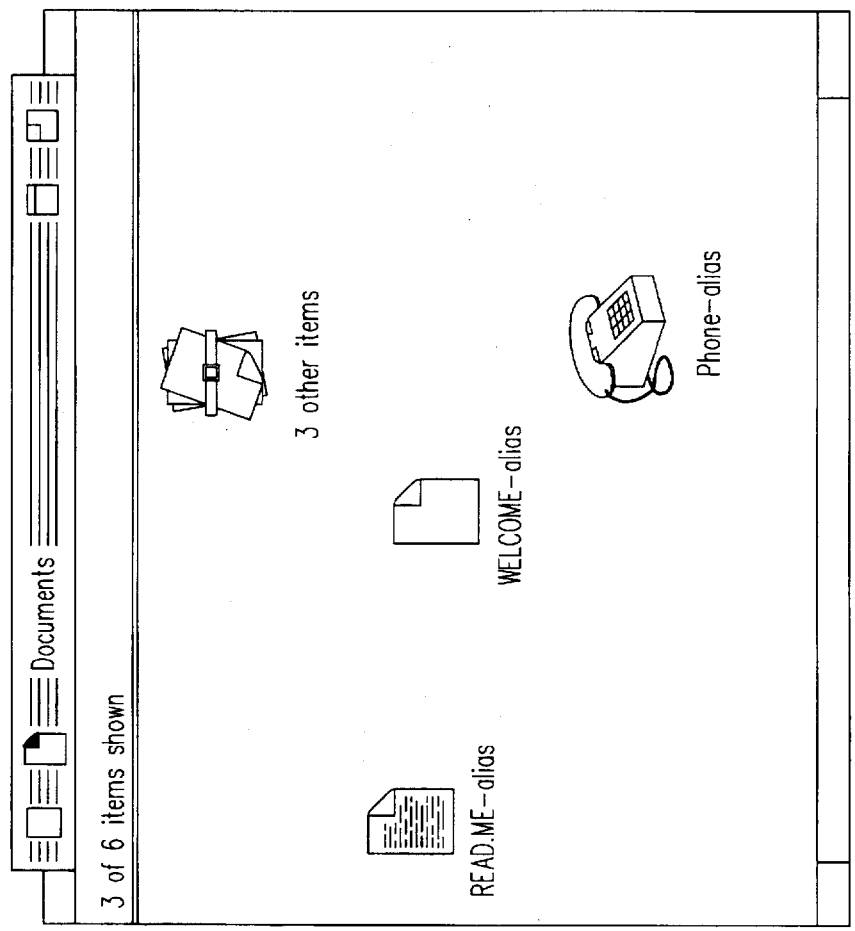
Figure 7:
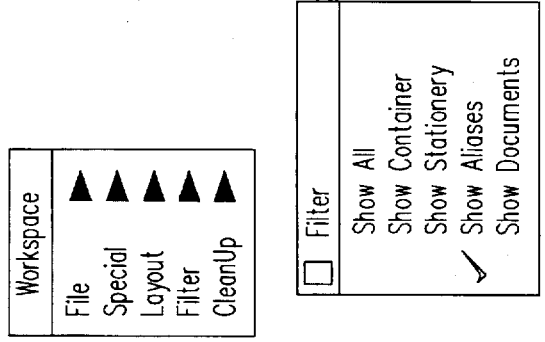

In FIG. 7, a user has selected the "Show Aliases" menu item. Note, that the Filter Menu reflects this change in filter denoted by a check mark next to the "Show Aliases" option. This change in filter has affected the presentation. The status bar now reads, "3 of 6 items shown." Only the items which are aliases remain. Also, a new icon has appeared which looks like a stack of documents entitled "3 other items." This "other items" along with the "3 of 6 items shown" status bar serve together to visually emphasize that some items are NOT shown. It is important to provide clear feedback to a user that a filter is in use so that they do not mistakenly think their documents have disappeared. When a filter is selected by clicking on the menu, it causes a menu state object to update the menu checkmark and notify the filtering framework that a new filter has been selected. The filtering framework then creates a new filter of the selected type and installs it in the filter holder. The "other items" bundle is backed by a data structure which holds the set of which items are filtered.

Figure 8:
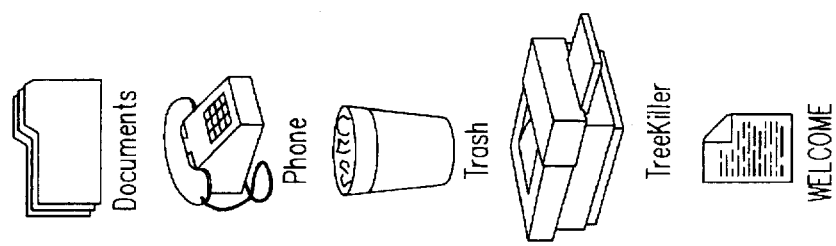
FIG. 8 illustrates a display showing a window after the show stationery has been invoked in accordance with a preferred embodiment.
Figure 8:
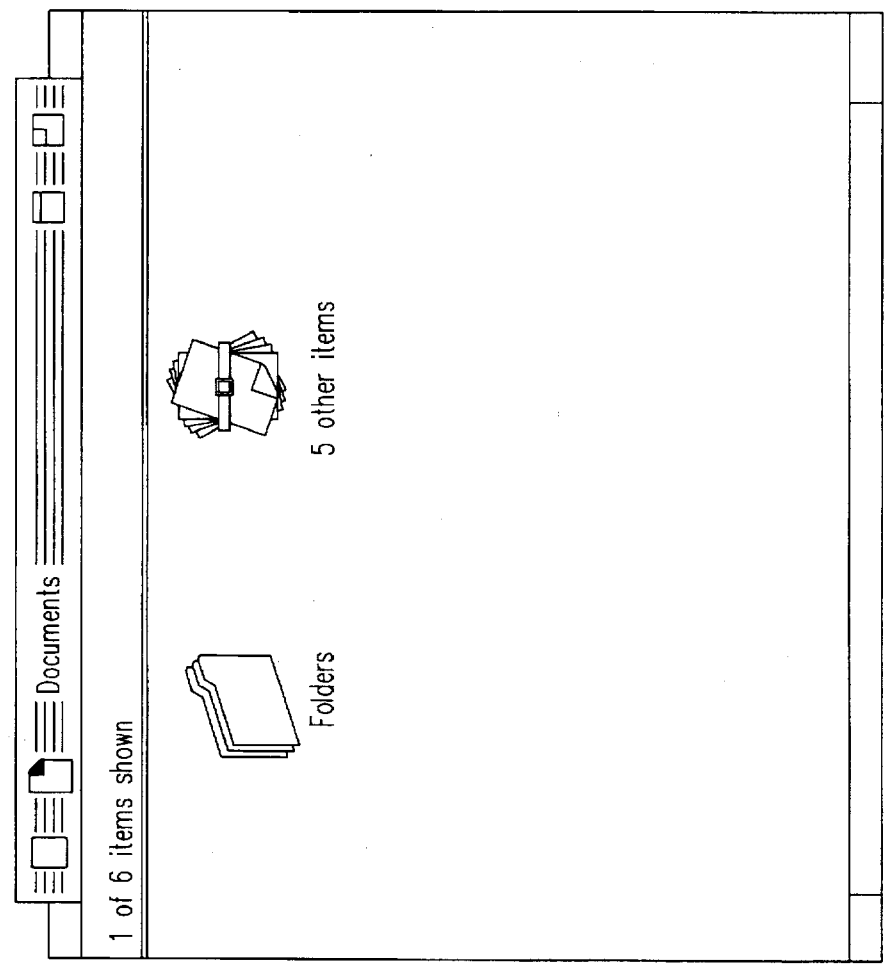
Figure 8:
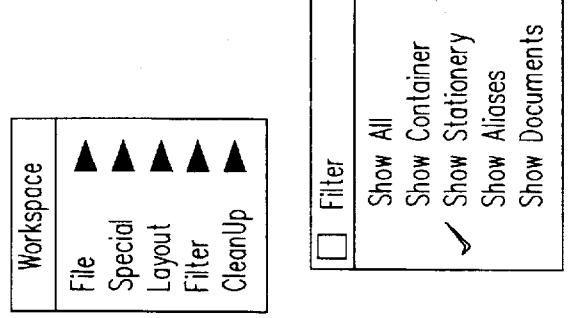

In FIG. 8, the user has selected the "Show Stationery" menu item. Again, the check mark denotes which filter has been chosen. Now, the status bar indicates, "1 of 6 items shown." The Folders stationery is shown along with the "5 other items" icon.

Filtering Framework Internals

When a user selects a filter from a menu, a filter object of the type selected is created within the Filter Framework. Whenever a new filter is created, the Filter Framework sends a message to the Sorter Framework to indicate that a new filter has been installed and consequently the filtered status of the presented items may have changed. The sorter then may ask the filter questions to determine if any state has changed and take appropriate action. Once the Sorter Framework has synchronized to the change caused by the filter installation, it sends a message forward to the view that some information may have changed. The view then takes similar action and synchronizes to information provided by the sorter.

Developing a Filter

Supporting Classes

The items that the user sees in the window are called containable components. In the filtering framework, containable components are referred to by containable component references (TContainableComponentReference). References allow the framework to keep information about containable components without keeping copies of the containable components themselves. Further, the filter framework has an object called a TContainableComponentInfo which holds two pieces of information: 1) a TContainableComponentReference, and 2) a boolean value indicating whether or not this containable component is marked filtered.

```
class TContainableComponentInfo: public MCollectible {
public:
    MCollectibleDeclarationsMacro(TContainableComponentInf
o);
    //contructor - caller provides a
TContainableComponentReference
        TContainableComponentInfo(const
TContainableComponentReference&);
    //copy constructor
        TContainableComponentInfo(const
TContainableComponentInfo&);
    //destructor
    virtual ~TContainableComponentInfo( );
    //assignment operator
        TContainableComponentInfo& operator=(const
TContainableComponentInfo&);
    //streaming operators
    virtual TStream& operator>>=(TStream& towhere) const;
    virtual TStream& operator<<=(TStream& fromwhere);
    //comparison and hashing for use by collections
    virtual long Hash( ) const;
    virtual Boolean IsEqual(const MCollectible*) const;
    //information interface for getting info about reference
and filtered status
    virtual TContainableComponentReference
        GetContainableComponentReference( ) const;
    virtual Boolean IsFiltered( ) const;
    virtual void SetFiltered( );
protected:
    TContainableComponentInfo( );
};
```

When a filter is invoked, a parameter, MContainableComponentSource, is passed to the filter. This parameter is used to indicate various characteristics concerning the information being filtered. First, what order should be used to filter the items? Second, what item comes before this one? The "C++" source code for the MContainableComponentSource Application Program Interface (API) is presented below.

```
class MContainableComponentSource {
public:
    //get information about model where containables
components are kept
    virtual TModelReference GetModelReference( ) const =
0;
    //get ordered list of containble component infos
    virtual void
GiveReferences(TFunnelFor<TContainableComponentInfo>&)
const = 0;
    //get reference of containble component before this one,
is First is set to TRUE
    //is this one is the first one
    virtual TContainableComponentReference
        Before(const TContainableComponentReference&, Boolean&
isFirst) const = 0;
};
```

The Filter

In essence, a filter is an object with the ability to look at a collection of containable components and determine, on the basis of a deterministic algorithm, which containable components should be marked "filtered" and which ones should not be. A deterministic algorithm is one that gives the same result everytime. Given a set of 10 numbers, an algorithm that determines the largest number is deterministic, but algorithm that picks one of the 10 at random is non-deterministic.

A C++ implementation of an abstract interface for a container filter is presented below in accordance with a preferred embodiment of the invention.

```
class TContainerFilter: pubic MCollectible {
public:
    VersionDeclarationsMacro(TContainerFilter);
    //constructor takes a MContainableComponentSource for the
filter to use
        TContainerFilter(MContainableComponentSource*
toAlias);
    //destructor
    virtual ~TContainerFilter( );
    //give information in filtered state
    virtual void
GiveReferences(TFunnelFor<TConatinableComponentInfo>&)
const = 0;
    //synchronize with information provided by
MContainableComponentSource
    virtual void SycnUp( ) = 0;
    //new containble components have arrived, process them,
report changes
    virtual void Add(TContainableComponentInfoCollection&
added,
        TContailableComponentInfoCollection&
changedResult) = 0;
    //containble components have been removed, process them,
report changes
    virtual void
Remove(TContainableComponentReferenceCollection& removed,
        TContainableComponentInfoCollection&
changedResult) = 0;
    //containble components have changed, process them, report
further changes
    virtual void Change(TContainableComponentInfoCollection&
changed,
        TContainableComponentInfoCollection&
changedResult) = 0;
protected:
    //subclasser interface to get MContainableComponentSource
to use
    MContainableComponentSource* GetSource( ) const;
};
```

TContainerFilter has five "interesting" member functions—the pure virtual logic that developers override to customize filter functionality. The behavior of these functions is specified below:

| virtual void | SyncUp( ) = 0; |

When SyncUp is called, this is an indication that the source information has changed significantly and the entire internal state of the filter should be updated. Some filters have no internal state. More complex filters must keep track of previously encountered information in order to execute efficiently. Some filters can decide whether a containble component is filtered on a case by case basis, for example a filter that passes containble component whose name starts with the letter "A". Other filters need to consider multiple containble component at once in order to make a decision, for example a filter that only passes containble components whose names are pair of a .C/.h pair. (if a containble component named foo.C existed, it would only pass through the filtered of a containble component named foo.h also existed). Sophisticated filters like this can be implemented more efficiently if they maintain internal state which caches information about all the containble components being presented. SyncUp gives the filter a chance to rebuild this cache when a large change occurs.

| virtual void |
| GiveReferences(TFunnelFor<TContainableComponentInfo>& funnel) = 0; |

When GiveReferences is called, a request is being made for the complete output of the filter. The filter should iterate over all the items and transfer them to the funnel which is passive iteration mechanism. Filters are required to give the TContainableComponentInfo's in the same order that it would receive them if it called GiveReferences on the source. This is important to allow filters to be used on a sorted list of containble components:

| virtual void | Add(TContainableComponentInfoCollection& added, |
| | TContainableComponentInfoCollection& changedResult) = 0; |

Add is passed two collections:add is a collection of those containable components that have been added to the source and should be considered by the filter—update the filter's internal state (if any) and decide whether or not each containable component should be filtered out. ChangedResult is used by more sophisticated filters that may change their mind about previously seen containable components when a new one is added. For example, a filter that only allows documents to pass if they are part of a .C or a .h pair may have previously filtered foo.h because foo.C was not in the source. When foo.C is added, it needs to unfilter foo.h—therefore an unfiltered foo.h would be added to the changedResult.

| virtual void | Remove(TContainableComponentInfoCollection& removed, |
| | TContainableComponentInfoCollection& changedResult) = 0; |

Remove is very similar to Add except that instead of considering containable components that have been added to the source, it considers ones that have been removed.

| virtual void | Change(const MContainableComponentSource* source, |
| | TContainableComponentInfoCollection& changed, |
| | TContainableComponentInfoCollection& changedResults) = 0; |

Change is very similar to Add except that instead of considering containable components that have been added to the source, it considers ones that have changed in some way. Essentially, this allows for some optimization. The net result of a change should be the same as removing and re-adding the item. One possible implementation of Change is to call Remove and then Add Changes in containble components are important to filtering because the change may change the result of the filter. For example if the filter only passes containble components whose name starts with "A" and a containble component changes its name from "Apple" to "Pear", then the filter which previously passed this containble component needs to reverse its decision and mark the containble component as filtered.

Filter IDs

The final step in developing a filter, is to create a TContainerFilterID subclass which serves as a light-weight representation of the filter. TContainerFilterID's have 3 primary functions which include:
1. create a filter;
2. create a label to represent that filter in a menu; and
3. create a unique token that acts as an identifier.

```
class TContainerFilterID: public MCollectible {
public:
        VersionDeclarationsMacro(TContainerFilterID);
    TContainerFilterID(const TContainerFilterID&);
        virtual~TContainerFilterID( );
        TContainerFilterID&      operator=(const
TContainerFilterID&);
        virtual TStream&         operator>>=(TStream&)
const;
        virtual TStream&         operator<<=(TStream&);
        virtual long             Hash( ) const;
        virtual Boolean          IsEqual(const MCollectible*)
const;
        //provide menu label, TContainerPresenterState support
        virtual TLabel*          CreateLabel( ) const = 0;
        virtual TContainerFilter*
CreateContainerFilter(MContainableComponentSource* toAlias)
const = 0;
        //must same return unique identifier as corresponding
TContainerFilter
        virtual TToken           GetToken( ) const = 0;
#ifndef NO_Internal
private:
        enum EVersion            {kVersion1};
#endif
};
```

Adding a New Filter

Once a new filter is created by a developer, it is simple to add it to the Filter Framework. The new filter ID is written into a file and placed in a "filters" directory on the disk. When creating the "filters" menu, this directory is scanned and all filter IDs found are made available to the user. Said another way, when the menu of available filters is being constructed, all the IDs found in files in the "filters" directory are consulted for a name. These names are placed in the "filter" menu. When one of these menu items is selected by the user, the ID for that name is used to constructor the actual filter object using the CreateContainerFilter method. One of ordinary skill in the art will readily comprehend based on a careful review of the architecture set forth herein that filters can readily be cascaded without departing from the invention. Thus, if two or more filters are defined, they can be joined in series to apply a variety of filters to a view before the view is redisplayed.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A window display system for use in a computer system having a storage and a display, the window display system operating to selectively display icons representing non-filtered display items and filtered display items, the window display system comprising:

(a) a container framework in the storage including methods for storing and manipulating information indicative of each display item;

(b) a filter framework in the storage including methods for constructing a filter object containing filter object criteria data, methods for extracting the stored display item information and methods for applying the filter object criteria to the extracted display item information to separate non-filtered display items and filtered display items; and (c) a view framework responsive to the display items for displaying an icon for each non-filtered display item and a bundle icon representing all filtered display items, the bundle icon including a count of all filtered display items.

2. A window display system as recited in claim 1, including a sorter framework including methods responsive to the non-filtered display items for sorting the non-filtered display items.

3. A window display system as recited in claim 1, including a set of filter objects and means for cascading the set of filter objects to apply the filter object criteria data in all of the set of filter objects to the extracted display item information to separate non-filtered display items and filtered display items.

4. A window display system as recited in claim 1 wherein the filter framework includes an object which includes a reference to each of the display items and a value for each referenced display item indicating whether the each referenced display item is filtered.

5. A window display system as recited in claim 1, wherein the filter object includes a cache mechanism for temporarily storing information relating to extracted display item information.

6. A window display system as recited in claim 1 wherein the filter object includes a method for restoring extracted display item information in the cache mechanism.

7. A window display system as recited in claim 1 wherein the filter object includes a method for examining display items which are added to the plurality of display items after an initial examination.

8. A window display system as recited in claim 1 wherein the filter object includes a method for examining display items which are removed from the plurality of display items after an initial examination.

9. A window display method for use in a computer system having a storage and a display, the window display method operating to selectively display icons representing non-filtered display items and filtered display items, the window display method comprising the steps of:

(a) storing and manipulating information indicative of each display item;

(b) constructing a filter object containing filter object criteria data, methods for extracting the information the stored display item information and methods for applying the filter object criteria to the extracted display item information to separate non-filtered display items and filtered display items; and (c) displaying an icon for each non-filtered display item and a bundle icon representing all filtered display items, the bundle icon including a count of all filtered display items.

10. A window display method as recited in claim 9, including the step of:

(d) sorting the non-filtered display items.

11. A window display method as recited in claim 9, wherein step (c) includes the steps of:

(b1) constructing a set of filter objects; and (b2) cascading the set of filter objects to apply the filter object criteria data in all of the set of filter objects to the extracted display item information to separate non-filtered display items and filtered display items.

12. A window display method as recited in claim 9 wherein step (b) includes the step of:

(b3) constructing an object which includes a reference to each of the display items and a value for each referenced display item indicating whether the each referenced display item is filtered.

13. A window display method as recited in claim 9, wherein step (b) includes the step of:

(b4) creating a cache mechanism in the filter object for temporarily storing information relating to extracted display item information.

14. A window display method as recited in claim 13 wherein step (b4) includes the step of:

(b4a) creating in the filter object a method for restoring extracted display item information in the cache mechanism.

15. A window display method as recited in claim 9 wherein step (b) includes the step of:

(b5) creating in the filter object a method for examining display items which are added to the plurality of display items after an initial examination.

16. A window display method as recited in claim 9 wherein step (b) includes the step of:

(b6) creating in the filter object a method for examining display items which are removed from the plurality of display items after an initial examination.

17. A computer program product for use in a computer system having a storage and a display, the computer program product operating to selectively display icons representing non-filtered display items and filtered display items, and comprising a computer usable medium having computer readable program code thereon including:

(a) container framework code including methods for storing and manipulating information indicative of each display item;

(b) filter framework code including methods for constructing a filter object containing filter object criteria data, methods for extracting the information the stored display item information and methods for applying the filter object criteria to the extracted display item information to separate non-filtered display items and filtered display items; and (c) view framework code responsive to the display items for displaying an icon for each non-filtered display item and a bundle icon representing all filtered display items, the bundle icon including a count of all filtered display items.

18. A computer program product as recited in claim 17, including on the computer usable medium sorter framework code including methods responsive to the non-filtered display items for sorting the non-filtered display items.

19. A computer program product as recited in claim 17, wherein each of the constructed filter objects includes means for cascading a set of filter objects to apply the filter object criteria data in all of the set of filter objects to the extracted display item information to separate non-filtered display items and filtered display items.

20. A computer program product as melted in claim 17 wherein the filter framework code includes constructor code for constructing an object which includes a reference to each of the display items and a value for each referenced display item indicating whether the each referenced display item is filtered.

21. A computer program product as recited in claim 17, wherein each of the constructed filter objects includes a cache mechanism for temporarily storing information relating to extracted display item information.

22. A computer program product as recited in claim 21 wherein each of the constructed filter objects includes a method for restoring extracted display item information in the cache mechanism.

23. A computer program product as recited in claim 17 wherein each of the constructed filter objects includes a method for examining display items which am added to the plurality of display items after an initial examination.

24. A computer program product as recited in claim 17 wherein each of the constructed filter objects includes a method for examining display items which are removed front the plurality of display items after an initial examination.

* * * * *